(12) United States Patent
Dutta (10) Patent No.: US 8,712,843 B2
(45) Date of Patent: Apr. 29, 2014

(54) SCORING USERS OF NETWORK BASED USERS

(75) Inventor: Debajyoti Dutta, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 864 days.

(21) Appl. No.: 12/877,426

(22) Filed: Sep. 8, 2010

(65) Prior Publication Data

US 2012/0059710 A1 Mar. 8, 2012

(51) Int. Cl.
 *G06Q 30/02* (2012.01)
(52) U.S. Cl.
 USPC ...................................................... 705/14.46
(58) Field of Classification Search
 USPC .................. 705/14.46, 14.69, 14.7
 See application file for complete search history.

(56) References Cited

U.S. PATENT DOCUMENTS

| | | | |
|---|---|---|---|
| 8,145,526 B2* | 3/2012 | Redlich | 705/14.46 |
| 8,175,950 B1* | 5/2012 | Grebeck et al. | 705/36 R |
| 2009/0094108 A1* | 4/2009 | Bhandari et al. | 705/14 |
| 2009/0327057 A1* | 12/2009 | Redlich | 705/14.2 |
| 2011/0145070 A1* | 6/2011 | Wolinsky et al. | 705/14.61 |

* cited by examiner

*Primary Examiner* — Donald L. Champagne
(74) *Attorney, Agent, or Firm* — James J. DeCarlo; Greenberg Traurig, LLP (57) ABSTRACT

Methods, systems and computer program products for evaluating a score for a particular user of network-based services. In one method, advertisements are provides on webpage(s) of the user. The webpage(s) may include content generated by the user. Advertising revenue generated by the webpage(s) is calculated and a score is assigned to the user based on the calculated advertising revenue.

19 Claims, 6 Drawing Sheets

| Visitor | Content Viewed | Comments Posted | Content Shared |
|---------|----------------|-----------------|----------------|
| A | Yes | No | No |
| B | Yes | Yes | No |
| C | Yes | Yes | Yes |
| D | No | No | No |

| User | Metric | Privileges Recommended |
|---|---|---|
| A | 1 | 250MegaByte Extra Storage |
| B | 5 | 1GigaByte Extra Storage |
| C | 15 | 5% revenue sharing, 2GigaByte Extra Storage, 25% waiver in fees |
| D | 9 | 1GigaByte Extra Storage, 50% waiver in fees |

SCORING USERS OF NETWORK BASED USERS

TECHNICAL FIELD

The present disclosure generally relates to systems and methods directed to scoring users of network-based services.

BACKGROUND

Social networks and other utilities such as content sharing, blogging, e-mail, online communities, and forums have become prevalent in recent years as a popular means for connecting users (including people, businesses, and other entities). Users of social networking websites associate themselves with one or more other users of the social network, thus creating a web of connections among the users of the social networking website. Users of such services are generally connected with each other through social ties such as friends, family, acquaintances, etc. Users may also be connected through one or more common attributes in their profiles, such as geographic location, employer, job type, age, hobbies or other attributes.

Users of social networking services, as well as other online services such as email, blogs, and the like, generate online content (hereinafter user-generated content). The user may also post contact information, background information, job information, hobbies, and/or other user-specific data to his or her profile on a social networking website. The profile may include one or more webpages to represent the user information and content added by the user in his or her profile. The content may include multimedia content, audio content, visual content etc. The content may also include any text content generated by the user, such as in an email, blog post, activity on an online community etc. Other users of the social networking website can then access this user-generated content.

In many instances, advertisers leverage the user-generated content by placing advertisements on the webpage(s) showing such content. Often, the advertising fee is directly correlated to the number of times an advertisement is viewed (per-view basis) or the number of times an advertisement is clicked (per-click basis). Therefore, popular user-generated content often leads to greater advertising revenue for a service provider hosting the content. Consequently, the users that generate popular content are more valuable to the service providers. Presently, the social networking service providers lack effective ways of targeting users that generate popular content.

SUMMARY

In particular embodiments, the present invention provides methods, systems and computer program products directed to scoring a user of network-based services. In one method, advertisements are provided on webpage(s) of the user. The webpage(s) include the profile of the user and may contain user-generated content. Advertising revenue is calculated from the webpage(s) and a score is determined for the user based on the calculated advertising revenue from the webpage(s).

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Example Network Environment

Figure 1:
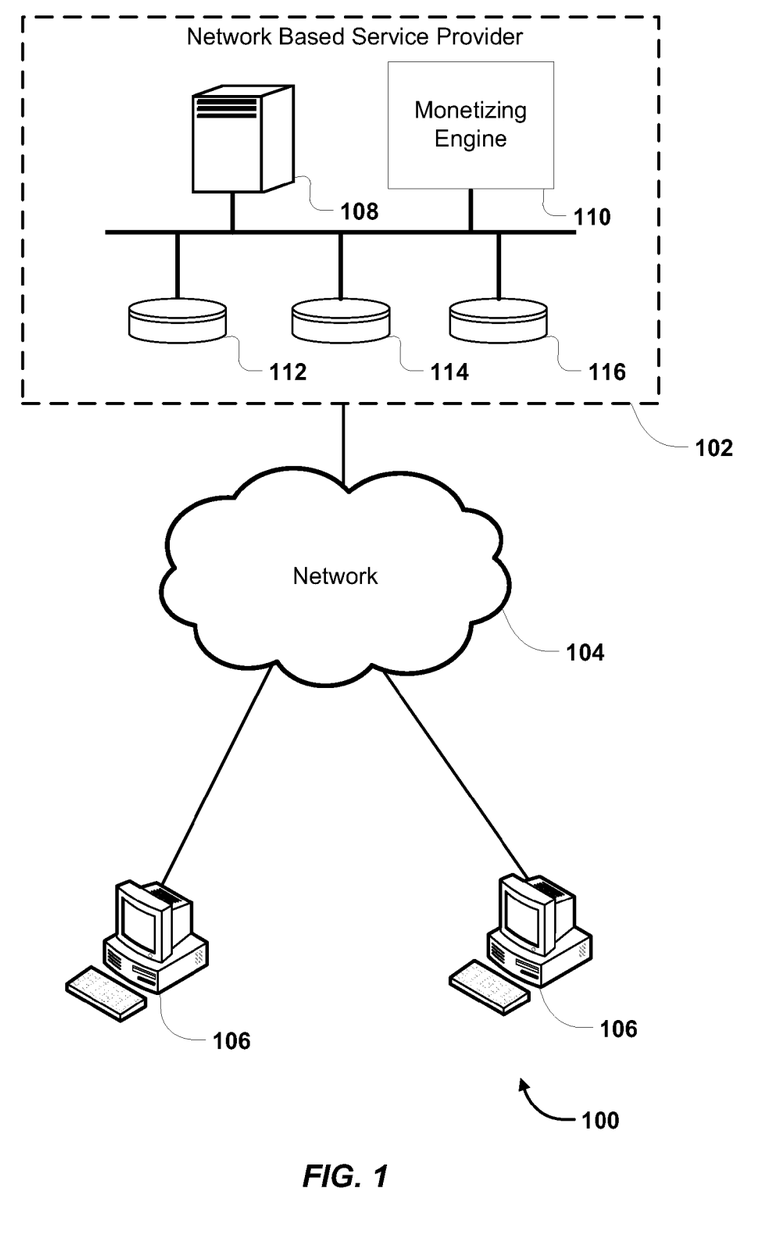
FIG. 1 illustrates an example network environment in which particular implementations may operate.

FIG. 1 illustrates an implementation of a network environment 100 in which various implementations of the invention may be deployed, according to one embodiment. Network environment 100 includes a network based service provider 102, a network 104, and one or more client nodes 106. In various embodiments of the present invention, network based service provider 102 further includes an application server 108, a monetizing engine 110, a user profile database 112, a user characteristics database 114, and an advertisement database 116. Network 104 generally represents one or more interconnected networks, over which network based service provider 102 and client nodes 106 can communicate with each other. Network 104 may include packet-based wide area networks (such as the Internet), local area networks (LAN), private networks, wireless networks, satellite networks, cellular networks, paging networks, and the like. A person skilled in the art will recognize that network 104 may also be a combination of more than one type of network. For example, network 104 may be a combination of a LAN and the Internet. In addition, network 104 may be implemented as a wired network, or a wireless network or a combination thereof. Client nodes 106 are communicatively coupled to network based service provider 102 via network 104.

Client Nodes

Client nodes 106 are computing devices from which a user accesses the services provided by the network based service provider 102. Client nodes 106 have the capability to communicate over network 104. Client nodes 106 further have the capability to provide the user an interface to interact with the service provided by network based service provider 102. Client nodes 106 may be, for example, a desktop computer, a laptop computer, a mobile phone, a personal digital assistant, and the like. A client node may execute one or more client applications such as, without limitation, a web browser to access and view content over a computer network, an email client to send and retrieve emails and an instant messaging client for communicating with other users. Client nodes 106, in various embodiments, may include a Wireless Application Protocol (WAP) browser or other wireless or mobile device protocol suites such as, without limitation, Nippon Telegraph and Telephone (NTT) DoCoMo's i-mode wireless network service protocol suites, Enhanced Data rates for GSM Evolution (EDGE), and the like.

Network Based Service Provider

Network based service provider 102 is a network addressable system that hosts a network application accessible to one or more users over network 104. The network application may provide means for users to connect with each other through social ties including, without limitation, friends, relatives, family, colleagues etc. In an embodiment of the invention, users may also connect with each other through common attributes including, without limitation, users with similar hobbies or interests such as music, dance, reading, etc. Further, users may interconnect based on common characteristics such as users who are alumni of the same educational institute, or who work for the same employer. The network application may include, without limitation, an email service, a social or a business network, a blog service, an online forum, a Wiki service, a content distribution service or any other network application where at least part of content is generated by the users. Examples of such network applications, where users generate a part of the content include, without limitation, Flickr™, Answers™, Orkut™, Twitter™ etc. In such network applications, users create a user profile on the network application hosted by the network based service provider 102. However, in cases of email or blog-spots users create an account on the network application. The user profile may be a single webpage or a collection of webpage(s) hosted on the network application. The user may also add user-generated content on their profile. The user-generated content includes, without limitation, multimedia content, audio content, visual content, text content, and the like.

Application server 108 provides network application access to one or more client nodes 106 via network 104. Application server 108 may employ a user authentication system to allow user access to service related content. Application server 108 hosts the entire website architecture including, without limitation, webpage and applications implemented using Common Gateway Interface script (CGI), PHP Hyper-text Processor (PHP), Active Server Pages (ASP), Hyper Text Markup Language (HTML), Extensible Markup Language (XML), Java and the like. Application server 108 may include a mail server or other messaging systems known in the art for enabling users to send and receive messages. The messages may include emails, text messages, instant messages, and the like.

Further, application server 108 may monitor user actions and update user profile database 112 and user characteristics database 114 based on the actions of the users. Examples of user actions may include, without limitation, sending a message to another user of the network based services, joining an online group or a community, adding a relationship with another user, removing a relationship with another user, editing the user profile, viewing advertisements provided on the websites of the network based services, providing comments on content uploaded by a user, visiting and viewing other users' profiles, and the like.

User profile database 112 stores information about all the users registered with the network based service provider 102. The information stored in the user profile database 112 may include, without limitation, profile or account information filled in by the user while registering for the services and subsequently updated during the course of time. The information may further include details like number of connections of a user, content generated by the user, a count of visitors or number of other users accessing user's profile to view content uploaded on the webpage(s) of the user, comments posted by viewers of the user-generated content, and the like. Connections of the user may include, without limitation, friends, followers, social ties, business colleagues and the like. The user profile database 112 may further include information such as resources utilized by a user's profile. The resources may include, without limitation, storage space, bandwidth and the like. In an embodiment of the present invention, application server 108 dynamically updates user profile database 112 depending upon the changes in the profile of a user.

User characteristics database 114 may store information such as content viewing behavior of the user, advertisements viewed by the user, frequency of accessing the network service and the like. Furthermore, user characteristics database 114 may include tags which associate each user with a particular behavior. For example, users viewing sports related content may be tagged under 'sports', users viewing content related to electronic equipment may be tagged under 'gadgets', etc.

Network based service provider 102 may also include an advertisement server (not shown in the figure) for placing advertisements on a webpage of the user profile. Advertisement server retrieves advertisements from advertisement database 116 or an ad network (not shown). In an embodiment of the present invention, the advertisement server may provide targeted advertisements based at least in part on the behavior of the user or plurality of visitors to the webpage(s) of the user. Advertisement server may retrieve advertisements by mapping user's behavior stored in user characteristics database 114 to advertisements stored in advertisement database 116. For example, a user who frequently views content related to dating, such as dating tips, relationship guide and the like may receive advertisements of dating websites. Further, advertisement database 116 may also include the costs associated with advertisement, such as cost per impression for banner advertisements or cost per click for text advertisements. In an embodiment of the present invention, application server 108 dynamically updates advertisement database 116 with new advertisements and the cost structure for the new advertisements.

Evaluating a Score for Users of Network Based Services

Monetizing engine 110 determines a score associated with each user of the network based service provider 102. Monetizing engine 110 may utilize the data stored in databases 112, 114 and 116 to determine the score associated with each user of the network based services. The network based services may include, but not limited to, an email service, a social or a business network, a blog service, an online forum, a content distribution service or any other network application where at least part of content is generated by the user. In an embodiment of the invention, the advertisement server may provide advertisements on one or more webpage(s) of the user. The advertisements may be provided based on one or more parameters that may include, but not limited to, content viewing behavior of the user, number of connections in the user profile, content viewing behavior of visitors of the user's profile, interests/hobbies of user and the visitors, etc. The advertisements provided on the webpage(s) can be of different forms such as, without limitation, banner advertisements and text advertisements.

In an embodiment of the present invention, monetizing engine 110 calculates the advertising revenue from the one or more webpage(s) of the user. The advertising revenue is based at least in part on the number of times the advertisements are viewed and/or clicked by the visitors. The advertisements may be accessed by allowing the banner or display advertisements to get loaded on the webpage or by clicking on the text advertisements. Further, there is a cost per impression associated with the viewing of banner or display advertisements and similarly there is a cost per click associated with the text advertisements. Thus, in an embodiment of the invention, the calculated revenue is based at least in part on the value of cost per click and/or the cost per impression.

In another embodiment of the present invention, application server 108 may track the number of clicks on text advertisement and/or number of times the display advertisements loads on the webpage of the particular user. This information may be further logged in either a local memory in application server 108 or user characteristics database 114. In an exemplary embodiment of the present invention, a downloadable Web browser applet embedded in the Web page, such as a program written in an interpretive language such as Java™, Javascript or AJAX, may log the tracked interactions. The monetizing engine 110 may use the logged information to calculate the advertising revenue generated from the webpage(s) of the user. The advertising revenue may be based on one or more parameters including, but not limited to, timelines in which the revenue needs to be calculated, cost structure of the individual advertisements presented on the webpage(s) of the user etc.

The revenue estimation can be explained with an example embodiment of the present invention, where a user adds user-generated content on one or more webpage(s), which constitutes his profile on the network application provided by network based service provider 102. The content may include, without limitation, multimedia content, audio content, visual content, text content and the like. Further, the webpage(s) of the user includes both text advertisements and display advertisements. In an embodiment of the present invention, a plurality of visitors, assume a count "N", visit the webpage(s) to view the content added by the user. In various embodiments of the present invention, the visitors may be connected to the user through social ties or any other common attribute. Now, suppose "A" is the total number of times the visitors allow the advertisements to be displayed on the webpage(s) of the user and "B" is the number of times visitors click on the text advertisement. Since, application server 108 maintains a log of the advertisements interactions, monetizing engine 110 may utilize the log information to calculate the advertising revenue from the webpage(s) of the user. Monetizing engine 110 may also extract the cost per impression (CPI) associated with the display advertisement and cost per click (CPC) associated with the text advertisement from the advertisement database 116. Thus, monetizing engine 110 may calculate the advertising revenue generated by the webpage(s) of the user as:

$$R = A * CPI + B * CPC;$$

where "R" is the advertising revenue.

Further, monetizing engine 110 determines a score associated with the user based at least in part on the calculated advertising revenue from the webpage(s) of the user. In an embodiment of the present invention, the score may be a numerical value or a range of values associated with the user. For example, a score 10 can be assigned for a user whose webpage(s) generates a high revenue as compared to a score of 5 for a user whose webpage(s) generates comparatively less revenue. Similarly, a score range of 8-10 may be assigned to a high revenue generating user, 4-7 for medium revenue generating user and 1-3 for low revenue generating user. In a further embodiment of the present invention, score is equivalent to the value of the calculated revenue from the webpage(s) of the user.

In another embodiment of the present invention, the score associated with the user may depend upon the profit generated from the webpage(s) of the user. In an embodiment of the invention, to calculate the profit generated from the webpage(s), monetizing engine 110 calculates a cost associated with the webpage(s) and further deduct it from the calculated revenue. In an example embodiment of the invention, the associated cost of the webpage(s) may include, without limitation, storage cost which includes the cost incurred by the network based service provider 102 in storing the content generated by the user, and server maintenance and hardware costs incurred by the network based service provider 102. Monetizing engine 110 may utilize the information stored in the user profile database 112, to determine the cost associated with the webpage(s) of the user.

For example, let the storage cost obtained by monetizing engine 110 be "SC" and other costs associated with the webpage(s) be "OC". Thus, total cost incurred by the network based service provider 102 for the webpage(s) is $$C = SC + OC,$$

where "C" is the total cost

Monetizing engine 110 may then calculate the profit generated by the webpage(s) of the user as $$P = R - C,$$

where "P" is the profit, "R" is the advertising revenue and "C" is the total cost associated with the webpage(s)

In various embodiments of the present invention, a determined score for the user is equivalent to the value of the calculated profit "P" from the webpage(s) of the user.

Further, monetizing engine 110 can calculate an average profit from the webpage(s) as a function of the user-generated content. For example, the average profit for "m" instances of added content may be calculated as:

$$P = (P_1 + P_2 + \ldots + P_m)/m,$$

where $P_1, P_2, \ldots P_m$ are the calculated profit for content 1, 2, ... m respectively and P is the average profit generated by content added by the user.

In various embodiments of the present invention, the determined score for the user provides an indication of a monetary value associated with the user. Monetizing engine 110 may further evaluate probable future revenue from the webpage(s) of the user.

Future Revenue Evaluation

In an embodiment of the present invention, monetizing engine 110 may evaluate probable future revenue even before the user adds additional content on the webpage(s). Monetizing engine 110 may employ a mathematical model to calculate the probable future revenues from the webpage(s) of the user. For example, monetizing engine 110 may employ linear regression analysis based on one or more parameters such as, but not limited to, average revenue generated from each of the visitors to the webpage(s) and total number of social connection of the user at the time of estimating probable future revenue.

Monetizing engine 110 may calculate average revenue from visitors based on the number of visitors who visited the webpage(s) of the user as:

$$r = R/N,$$

where r is the average revenue generated by each of the visitors and R is the advertising revenue form the webpage(s).

A person skilled in the art will recognize that several mathematical modeling techniques exist in the current state of the art which may be employed by monetizing engine 110 to estimate the probable future revenue from the webpage(s) of the user.

In another embodiment of the present invention, probable future revenue estimation may based on the average revenue generated by the visitors and the number of strongly connected users who are viewing the content on the webpage(s) of the user. A strong connection for the user may be defined as a visitor who reads the content, writes comments on the content and also shares the content and/or comments with other users of the network based services. Various embodiments to identify strong connections of the user are explained in detail in conjunction with FIG. 3.

In an embodiment of the present invention, monetizing engine 110 classifies users based on the determined score of each user. For example, users whose webpage(s) generate revenues above a pre-defined threshold are considered high value users. Monetizing engine 110 further recommends privileges and/or incentives for the high value users based on the determined score. Privileges may include, without limitation, awarding more storage space, waiver of service subscription fees, allocation of more bandwidth, revenue sharing and many other such privileges. Various embodiments for recommending privileges are explained in detail in conjunction with FIG. 4.

Figure 2:
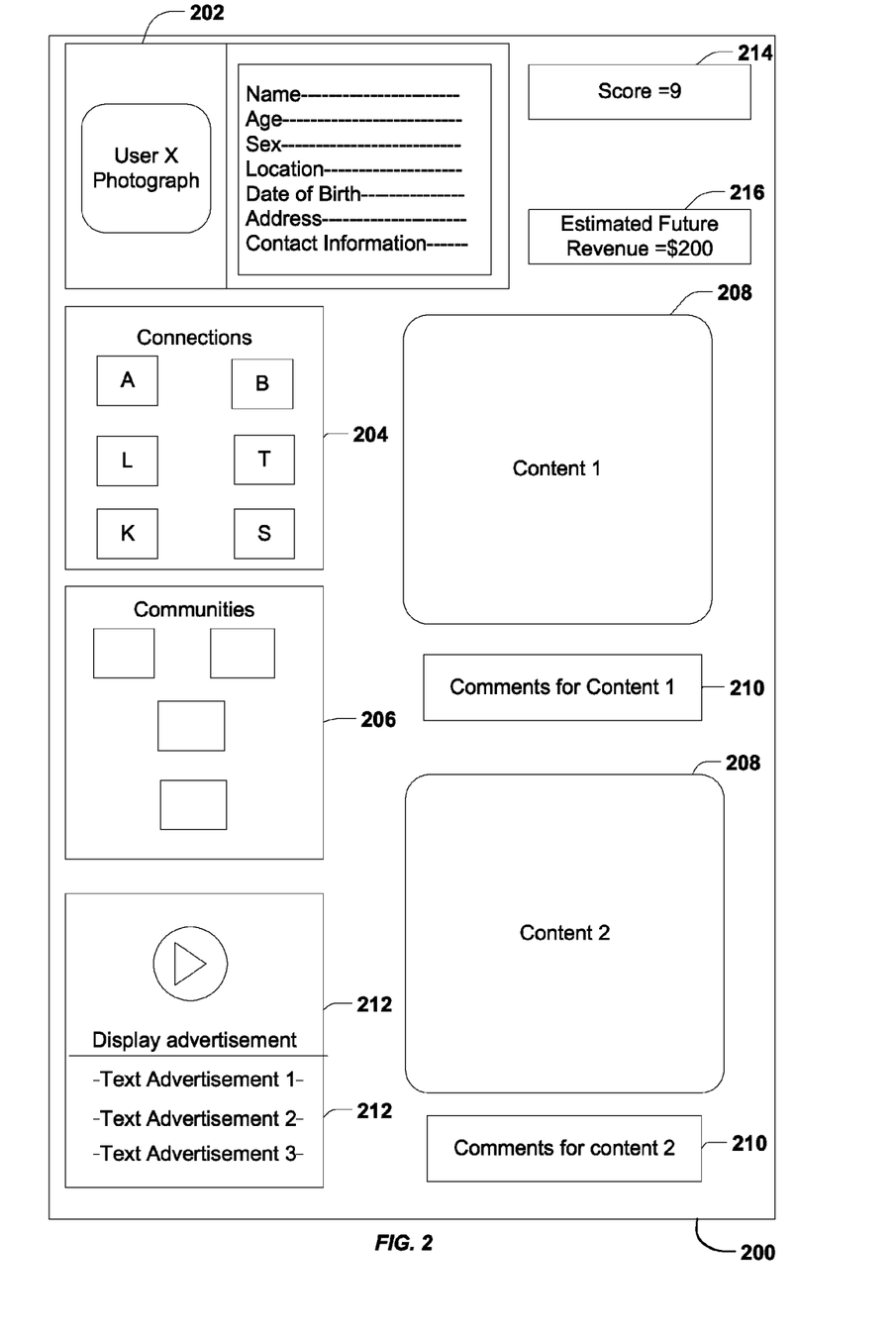
FIG. 2 illustrates a webpage of a user, using network based services according to one embodiment.

FIG. 2 illustrates an example webpage 200 of the user in accordance with an embodiment of the present invention. Webpage 200 of the user may include, without limitation, profile information 202, a list of connections 204 of the user, a list of communities 206 joined by the user, content 208 added by the user, one or more comments 210 posted by visitors for the content 208 and one or more advertisements 212. Profile information 202 may include, but not limited to, the user's identity information such as the user's photograph, name, age, gender, location, date of birth, address, and contact information. In an embodiment of the present invention, a plurality of visitors to the webpage 200 view content 208 added by the user, which is viewable on webpage 200 or on pages linked to webpage 200 directly or indirectly. The content 208 includes, without limitation, multimedia content, audio content, visual content, and text content. The visitors may post comments 210 expressing opinions on the content 208. Further, in an embodiment of the invention, visitors may also share content 208 and/or comments posted for the content with the plurality of other users by forwarding the link of the webpage 200 to the plurality of other users of the network based service provider 102.

In one embodiment of the present invention, advertisements 212 may be displayed on webpage 200. Advertisements 212 may be banner/display advertisements or text advertisements. The advertisements may be accessed by allowing the banner or display advertisements to get loaded on the webpage or by clicking on the text advertisements. Further, there is a cost per impression associated with the viewing of banner or display advertisements and similarly there is a cost per click associated with the text advertisements. Visitors to the webpage 200 of the user may view advertisements 212 based on their preferences. Advertisements 212 may be targeted based on one or more parameters such as, content viewing behavior of the user, number of connections of the user, content viewing behavior of the visitors to the webpage 200, interests/hobbies of users and/or visitors, etc. Monetizing engine 110 may calculate the advertising revenue based on the number of times the advertisement are viewed and/or clicked by the visitors. In one embodiment of the present invention, the calculated advertising revenue is also based on the value of the cost per impression and/or cost per impression. Moreover, monetizing engine 110 determines a score based on the calculated advertising revenue from the webpage 200. Further, in an embodiment of the present invention, monetizing engine 110 may also estimate probable future revenue based on the determined score and number of connections of the user at the time of estimating the probable future revenue. In an example embodiment of the present invention, webpage 200 displays score 214 and estimated probable future revenue 216 for the user.

Figure 3:
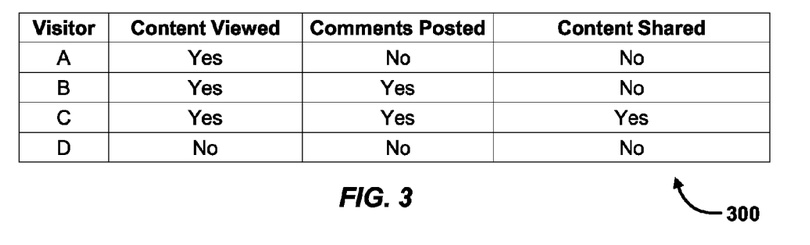
FIG. 3 illustrates an exemplary lookup table utilized to identify strong connections of the user according to one embodiment.

As described earlier, a user may be connected to plurality of other users using network based services. In an embodiment of the invention, estimation of probable future revenue generated depends on number of strong connections of the user. FIG. 3 illustrates the table 302, used in identifying strong connections of the user, in accordance to an example embodiment of the present invention. Monetizing engine 110 may generate table 302 from information stored in user characteristics database 114. Table 302 has details of the behavior of each visitor to the webpage(s) of a particular user 'X'.

Table 300 in FIG. 3 may be used in identifying strong connections of user 'X' as follows: visitor A reads the content added by user 'X'. However, visitor A does not write comment or share the content with other users of the network based service provider 102. Visitor B reads the content and also writes comments to express his/her opinion on the content but does not share the content. Visitor C reads the content, writes comments on the content and also shares the content with plurality of other users. However, visitor D does not view any of the content generated by user X. Webpage(s) with content, which has higher number of visitors, are more likely to generate more revenue as the chances of visitors viewing and/or clicking the advertisements increases. Thus, visitor C is stronger connection of user 'X' since user C is impacting the revenue generation. In an embodiment of the present invention, the number of strong connections of the user may be utilized in estimating probable future revenue from the webpage(s) of the user.

Figure 4:
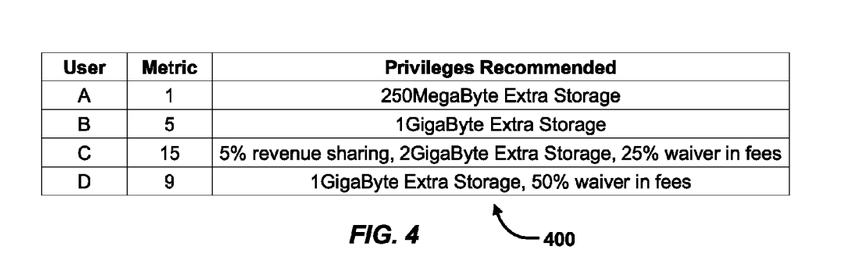
FIG. 4 illustrates an exemplary look up table utilized in recommending privileges for the user according to one embodiment.

Users whose generated content directly impacts revenue generation are of high value to network based service provider 102. FIG. 4 illustrates a lookup table 400 which is used in recommending privileges to high value users, in accordance with an exemplary embodiment of the present invention. Monetizing engine 110 uses table 400 in recommending privileges for the user, based on the determined score for each user. Table 402 contains a list of users, determined scores, and the recommended privileges for different ranges of scores. Since the score indicates a monetary value associated with the user, the user with a higher score is recommended more privileges than the user with a lower score. Privileges may include, without limitation, awarding more storage space, waiver of service subscription fees, allocation of more bandwidth, revenue sharing and many other such privileges. Referring to table 400, since user C has the highest score, he has been recommended highest privileges as compared to other users. For example, user C has been recommended 5% revenue sharing privilege along with more storage space and subscription fees waiver. Whereas, user A, with a lower score than user C, has been recommended only more storage space. In an embodiment of the present invention, the privileges recommended for a user may also depend on the estimated probable future revenue from the webpage(s) of the user.

Figure 5:
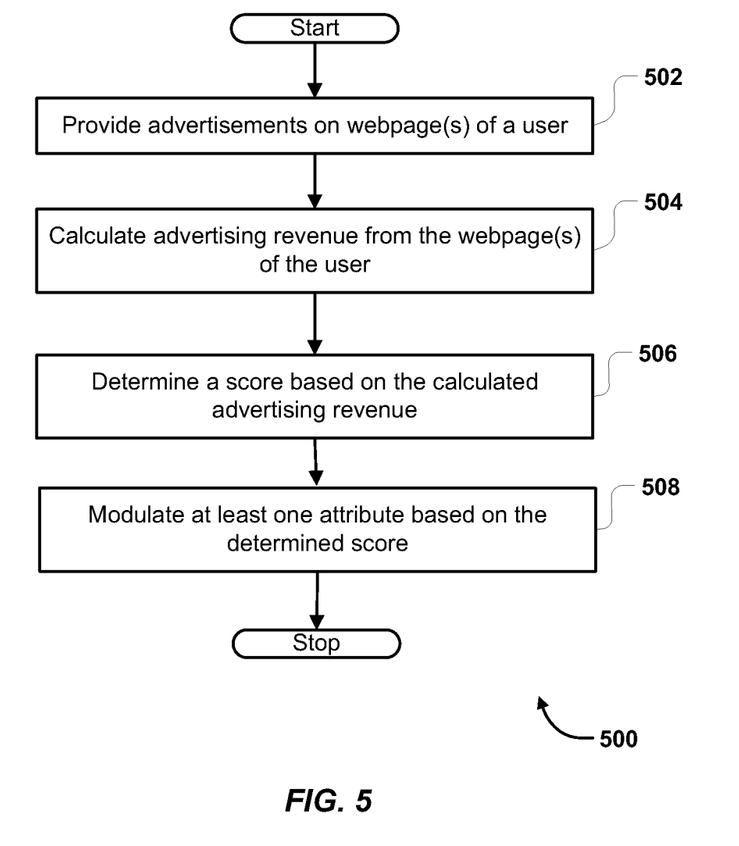
FIG. 5 is a flowchart illustrating an example method directed to scoring a user according to one embodiment.

FIG. 5 is a flowchart illustrating process 500 for determining a score for users, according to an embodiment of the present invention. At step 502, the advertisement server provides advertisements on webpage(s) of the user. The webpage(s) of the user may include profile information of the user and user-generated content such as, but not limited to, multimedia content, audio content, visual content, text content and the like. Further, advertisement server may provide advertisements on the webpage(s) of the user based on one or more parameters such as, user content viewing behavior, number of connections in the particular user profile, content viewing behavior of plurality of visitors, interests/hobbies of users and/or visitors, etc. The advertisements provided on the webpage(s) can be of different forms such as, but not limited to, banner/display advertisements, text advertisements, etc.

At step 504, monetizing engine 110 calculates advertising revenue from the webpage(s) of the user. The advertisements may be accessed by allowing the banner or display advertisements to get loaded on the webpage or by clicking on the text advertisements. Further, there is a cost per impression associated with the viewing of banner or display advertisements and similarly there is a cost per click associated with the text. In an embodiment of the present invention, the calculated revenue may based on a value of the cost per impression and/or the cost per click.

In another embodiment of the present invention, advertising revenue is calculated based at least in part on the number of times the advertisements are viewed and/or clicked by visitors. In an embodiment of the present invention, the visitors to the webpage(s) may have social ties or any other common attribute with the user. Application server 108 may track the number of clicks on text advertisement and/or number of times the display advertisements loads on the webpage of the user. This information may be further logged in either a local memory in application server 108 or user characteristics database 114. In an embodiment of the present invention, monetizing engine 110 may calculate the advertising revenue from the webpage(s) based on one or more parameters such as, without limitation, timelines in which the revenue needs to be calculated, cost structure of the individual advertisements presented on the webpage(s) of the user, etc.

At step 506, monetizing engine 110 determines a score for the user based at least in part on the calculated advertising revenue from the webpage(s) of the user. In an embodiment of the present invention, the score may be a numerical value or a range of values. In another embodiment of the present invention, the score for the user may depend upon a profit generated from the webpage(s) of the user. The profit may be calculated by estimating a cost associated with the webpage(s) of the user and further deducting it from the calculated revenue. In an exemplary embodiment of the invention, the associated cost of the webpage(s) may include, without limitation, storage cost which includes the cost incurred by the network based service provider 102 in storing the content generated by the user, and server maintenance and hardware costs incurred by the network based service provider 102. In various embodiments of the present invention, the determined score for the user provides an indication of a monetary value associated with the user. Further, in various embodiments of the present invention, the determined score of the user is used to evaluate probable future revenue from the webpage(s) of the user. Furthermore, monetizing engine 110 may utilize the evaluated probable future revenue and determined score to recommend various privileges or incentives for the user.

Score Evaluation Architecture

Figure 6:
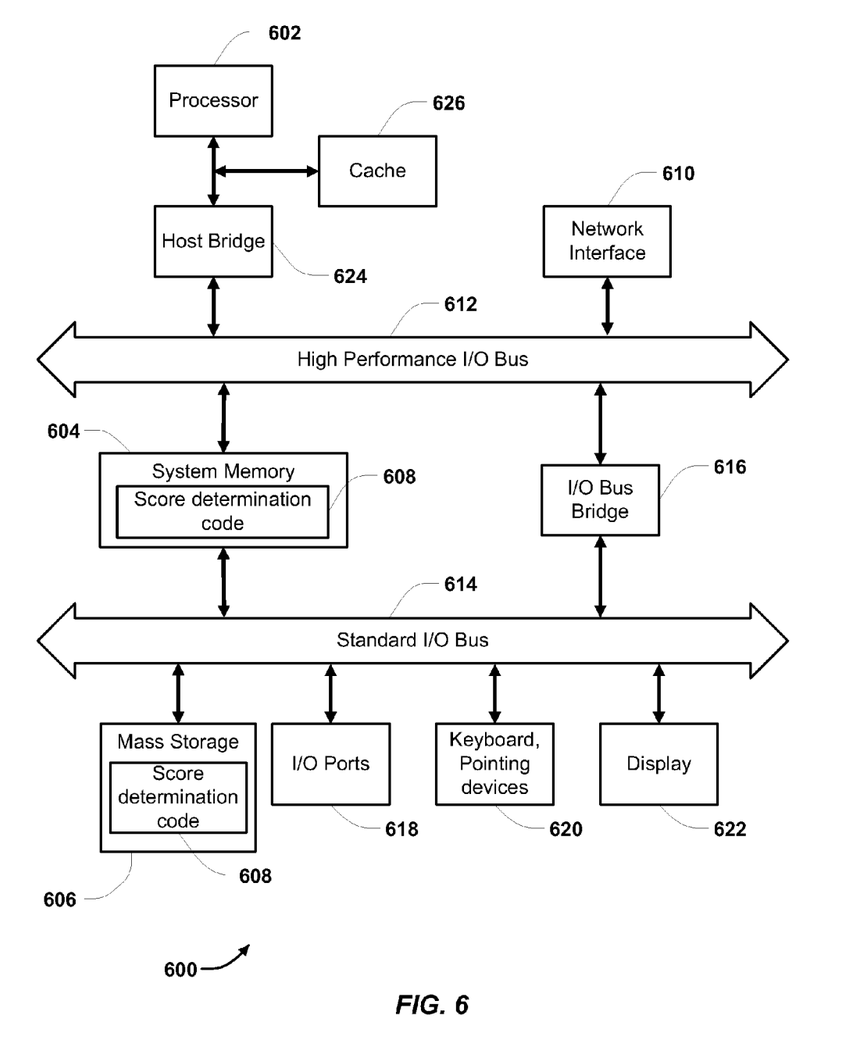
FIG. 6 is a schematic diagram illustrating an example computing system for scoring users according to one embodiment.

FIG. 6 illustrates an example hardware system 600 to implement the user valuation system according to one embodiment. Hardware system 600 includes at least one processor 602, a system memory 604, and mass storage 606. The system memory 604 has stored therein one or more application software, programming instructions for implementing score evaluation process 608, an operating system and drivers directed to the functions described herein. Mass storage 606 provides permanent storage for the data and programming instructions for user valuation process 608, whereas system memory 604 (e.g., DRAM) provides temporary storage for the data and programming instructions when executed by processor 602. The process flow of the programming instructions for score evaluation process 608 is described in detail in conjunction with FIG. 5. In one embodiment, databases 112, 114, and 116 (shown in the FIG. 1) may reside in mass storage 606. A network/communication interface 610 provides communication between hardware system 600 and any of a wide range of networks, such as an Ethernet (e.g., IEEE 802.3) network, etc. Additionally, hardware system 600 includes a high performance input/output (I/O) bus 612 and a standard I/O bus 614. System memory 604 and network/communication interface 610 couple to bus 612. Mass storage 606 couple to bus 614. I/O Bus Bridge 616 couples the two buses 612 and 614 to each other.

In one embodiment, user valuation process described herein is implemented as a series of software routines run by hardware system 600. These software routines comprise a plurality or series of instructions to be executed by a processor in a hardware system, such as processor 602. Initially, the series of instructions are stored on a storage device, such as mass storage 606. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 610. The instructions are copied from the storage device, such as mass storage 606, into system memory 604 and then accessed and executed by processor 602.

In one embodiment, hardware system 600 may also include I/O ports 618, a keyboard and pointing device 620, a display 622 coupled to bus 612. I/O ports 618 are one or more serial and/or parallel communication ports that provide communication between additional peripheral devices, which may be coupled to hardware system 600. A host bridge 624 couples processor 602 to high performance I/O bus 612. Hardware system 600 may further include video memory (not shown) and a display device coupled to the video memory. Collectively, these elements are intended to represent a broad category of computer hardware systems, including without limitation general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 600 may include a variety of system architectures; and various components of the hardware system 600 may be rearranged. For example, cache 626 may be on-chip with processor 602. Alternatively, cache 626 and processor 602 may be packed together as a "processor module," with processor 602 being referred to as the "processor core." Furthermore, certain embodiments of the present invention may not require nor include all of the above components. For example, the peripheral devices shown coupled to standard I/O bus 612 may couple to high performance I/O bus 612. In addition, in some embodiments only a single bus may exist with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
providing, via a computing device, advertisements on one or more webpages of a network-based service, said one or more web pages corresponding to a user and comprising content generated by the user;
calculating, via the computing device, advertising revenue generated by the one or more webpages of the user;
calculating, via the computing device, profit from the one or more web pages of the user, said calculated profit based at least upon an incurred cost by the network-based service for storing said content generated by the user;
determining, via the computing device, a score for the user based at least in part on the calculated advertising revenue and the calculated profit; and
modulating, via the computing device, at least one attribute of the network-based service provided to the user based at least in part on the score.

2. The method of claim 1, wherein the score provides an indication of a monetary value associated with the user.

3. The method of claim 1, wherein the advertisements comprises at least one of display advertisements, banner advertisements, and text advertisements.

4. The method of claim 1, wherein the advertisement revenue is based on at least one of cost per impression and cost per click.

5. The method of claim 1 further comprises evaluating probable future revenue associated with the user, wherein the probable future revenue is based at least in part on the determined score for the user.

6. The method of claim 5, wherein evaluating the probable future revenue comprises:
calculating an average revenue generated from visitors, wherein the average revenue is calculated revenue divided by number of visitors to the one or more webpages of the user; and
determining the probable future revenue by mathematical modeling, wherein the mathematical modeling is based at least in part on the number of visitors and the average revenue generated from the visitor.

7. The method of claim 6, wherein the visitors have social ties with user using connections provided by the network-based service.

8. The method of claim 5 further comprises facilitating display of at least one of the determined score or evaluated probable future revenue associated with the user on the one or more web pages.

9. The method of claim 1, wherein the profit calculation further comprises:
calculating a cost associated with the one or more webpages of the user; and
subtracting the cost from the calculated revenue.

10. The method of claim 9, wherein the cost associated with the one or more web pages of the user further comprises cost associated with the maintenance cost associated with the one or more webpages.

11. The method of claim 1, wherein providing advertisements on a webpage comprises providing targeted advertisements based at least in part of a behavior of the user and one or more visitors to the webpages of the user.

12. The method of claim 1, wherein the content comprises at least one of a multimedia content, text content, audio content, or visual content.

13. The method of claim 1 further comprises identifying high-value users based at least in part on the determined score for the user.

14. The method of claim 13 further comprises providing privileges corresponding to the network-based service to the high-value users.

15. The method of claim 14, wherein the privileges comprise at least one of providing more storage space, waiver of service subscription fees, allocation of more bandwidth and revenue sharing.

16. The method of claim 1, wherein the network-based service comprises at least one of an email service, a social or a business network, a blog service, an online forum, a content distribution service or any other network application where at least part of content is generated by the user.

17. A system comprising:
one or more network interfaces;
at least one processor;
a memory; and
computer program code stored in a computer readable storage medium, wherein the computer program code, when executed by the at least one processor, is operative to cause the system to:
provide advertisements on one or more webpages of a network-based service, said one or more web pages corresponding to a user and comprising content generated by the user;
calculate advertising revenue generated by the one or more webpages of the user;
calculate profit from the one or more web pages of the user, said calculated profit based at least upon an incurred cost by the network-based service for storing said content generated by the user;
determine a score for the user based at least in part on the calculated advertising revenue and the calculated profit; and
modulate at least one attribute of a network-based service provided to the user based at least in part on the score.

18. The system of claim 17, wherein the content comprises at least one of a multimedia content, text content, video content, audio content, or visual content.

19. A non-transitory computer readable storage medium tangibly encoded with computer program code, that when executed by a computing device, performs a method comprising:
- providing advertisements on one or more webpages of a network-based service, said one or more web pages corresponding to a user and comprising content generated by a user;
- calculating advertising revenue generated by the one or more webpages;
- calculating profit from the one or more web pages of the user, said calculated profit based at least upon an incurred cost by the network-based service for storing said content generated by the user;
- determining a score for the user based at least in part on the calculated advertising revenue and the calculated profit; and
- modulating at least one attribute of a network-based service provided to the user based at least in part on the score.

* * * * *